(12) United States Patent
Meredith et al.

(10) Patent No.: US 9,965,525 B2
(45) Date of Patent: May 8, 2018

(54) PROTECTING PERSONAL DATA

(71) Applicant: AT&T Mobility II LLC, Atlanta, GA (US)

(72) Inventors: Sheldon Kent Meredith, Roswell, GA (US); Mark Austin, Roswell, GA (US); Jeremy Fix, Acworth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 132 days.

(21) Appl. No.: 14/682,214

(22) Filed: Apr. 9, 2015

(65) Prior Publication Data

US 2016/0300067 A1 Oct. 13, 2016

(51) Int. Cl.
*H04L 29/06* (2006.01)
*G06F 17/30* (2006.01)
*H04M 15/00* (2006.01)
*H04W 4/04* (2009.01)
*G06F 21/62* (2013.01)

(52) U.S. Cl.
CPC .. *G06F 17/30539* (2013.01); *G06F 17/30477* (2013.01); *G06F 17/30554* (2013.01); *G06F 21/6254* (2013.01); *G06F 21/6263* (2013.01); *H04L 63/0421* (2013.01); *H04M 15/41* (2013.01); *H04W 4/04* (2013.01); *G06F 2221/2151* (2013.01)

(58) Field of Classification Search
CPC ............... G06F 21/60; G06F 17/30477; G06F 17/30539; G06F 17/30554; G06F 21/6254; G06F 21/6263; G06F 2221/2151; H04M 15/41; H04W 4/04; H04L 63/0421

USPC .................................................... 726/26, 30
See application file for complete search history.

(56) References Cited

U.S. PATENT DOCUMENTS

| | | | |
|---|---|---|---|
| 6,256,381 B1 * | 7/2001 | Donaghue, Jr. ..... | H04Q 11/0457 379/233 |
| 6,782,085 B1 * | 8/2004 | Becker ................. | H04M 15/00 379/111 |
| 7,242,924 B2 | 7/2007 | Xie | |
| 7,319,855 B1 * | 1/2008 | Brune .................... | G06Q 20/04 379/114.01 |
| 7,333,794 B2 | 2/2008 | Zappala | |
| 7,546,128 B2 | 7/2009 | Smith et al. | |
| 7,941,142 B2 | 5/2011 | Aikawa et al. | |
| 8,046,230 B1 * | 10/2011 | McIntosh ........... | G07C 9/00166 379/88.02 |
| 8,145,611 B2 * | 3/2012 | McCall ............. | G06F 17/30306 707/705 |
| 8,321,952 B2 | 11/2012 | Spalink et al. | |

(Continued)

OTHER PUBLICATIONS

"Further Notice of Proposed Rulemaking: Customer Proprietary Network Information", Federal Communications Commission, 32 pages, Jul. 9, 2007.

(Continued)

*Primary Examiner* — Sarah Su
(74) *Attorney, Agent, or Firm* — Scott P. Zimmerman, PLLC

(57) ABSTRACT

Personal information related to calls is protected from disclosure. Mobile location data may be useful for profiling users of mobile devices. However, information related to calls may need protection from disclosure. Any mobile location data related to calls is thus excluded from profiling efforts.

19 Claims, 10 Drawing Sheets

(56) References Cited

U.S. PATENT DOCUMENTS

| | | | |
|---|---|---|---|
| 8,875,255 B1* | 10/2014 | Dotan | G06F 21/31 |
| | | | 713/182 |
| 9,439,133 B2* | 9/2016 | Silver | H04W 4/027 |
| 9,509,840 B2* | 11/2016 | Zhang | H04M 1/274516 |
| 2007/0165802 A1* | 7/2007 | Fox | H04M 15/00 |
| | | | 379/114.03 |
| 2009/0111462 A1* | 4/2009 | Krinsky | H04W 24/08 |
| | | | 455/423 |
| 2012/0015632 A1 | 1/2012 | Silva | |
| 2013/0079032 A1* | 3/2013 | Singhal | H04W 4/02 |
| | | | 455/456.2 |
| 2014/0046711 A1 | 2/2014 | Borodow et al. | |
| 2014/0357219 A1* | 12/2014 | Nicolaescu | H04M 15/8038 |
| | | | 455/406 |
| 2015/0208229 A1* | 7/2015 | Tarleton | H04W 8/10 |
| | | | 455/433 |

OTHER PUBLICATIONS

"Protecting Your Telephone Records: Does Your Carrier's Privacy Policy Ring True?", 10 pages, Apr. 2009.

* cited by examiner

PROTECTING PERSONAL DATA

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as appears in the Patent and Trademark Office patents files or records, but otherwise reserves all copyrights whatsoever.

BACKGROUND

The Telecommunications Act of 1996 requires protection of CPNI data. Customer Proprietary Network Information (or "CPNI") is generated when using a telecommunications service. All telecommunications carriers thus strive to protect CPNI.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
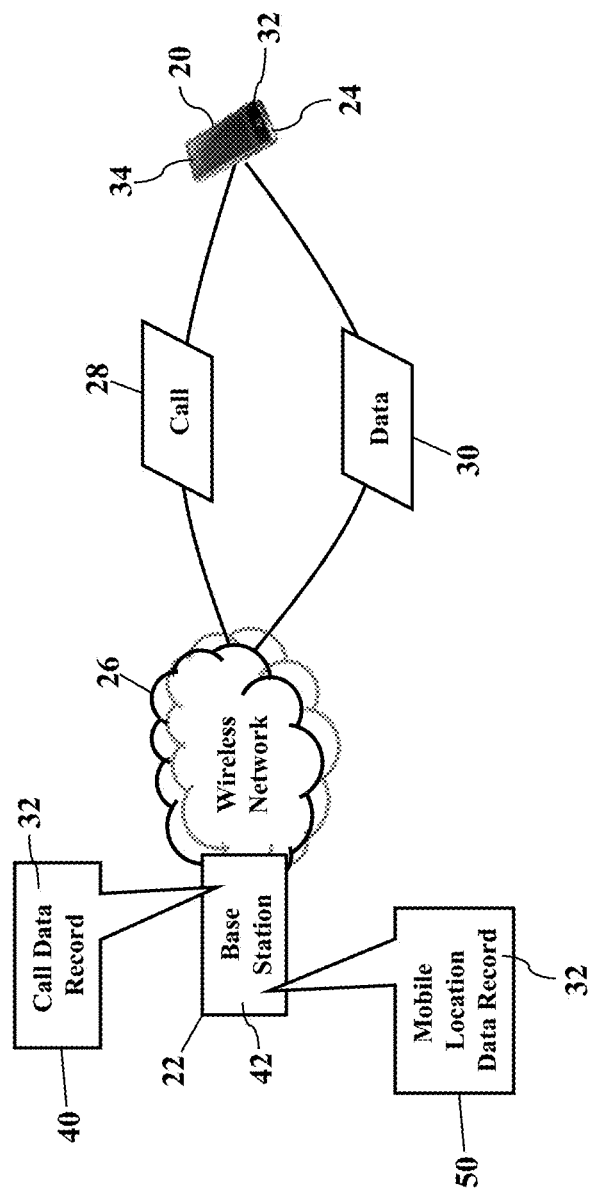
FIGS. 1-3 are simplified schematics illustrating an environment in which exemplary embodiments may be implemented.
Figure 2:
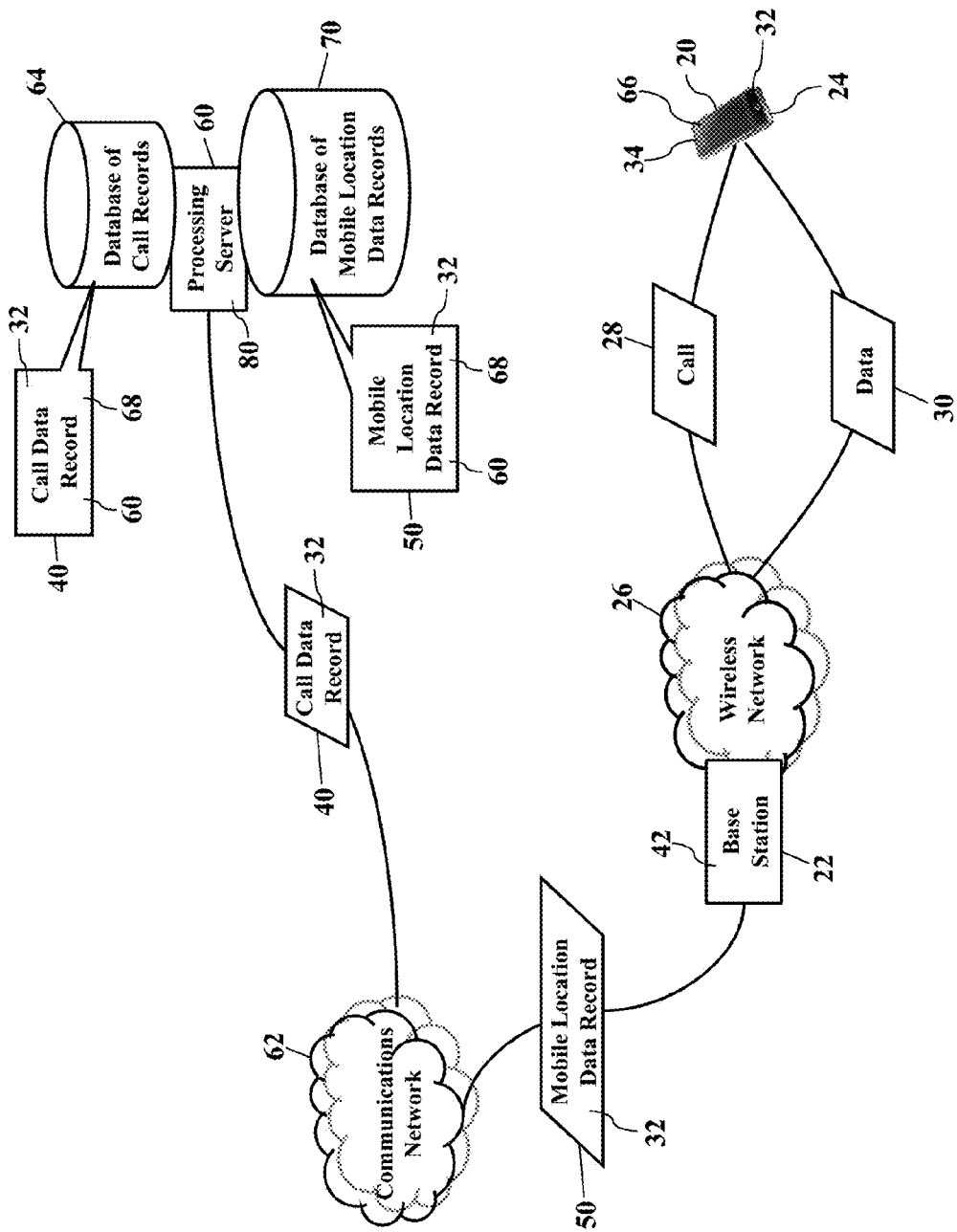
Figure 3:
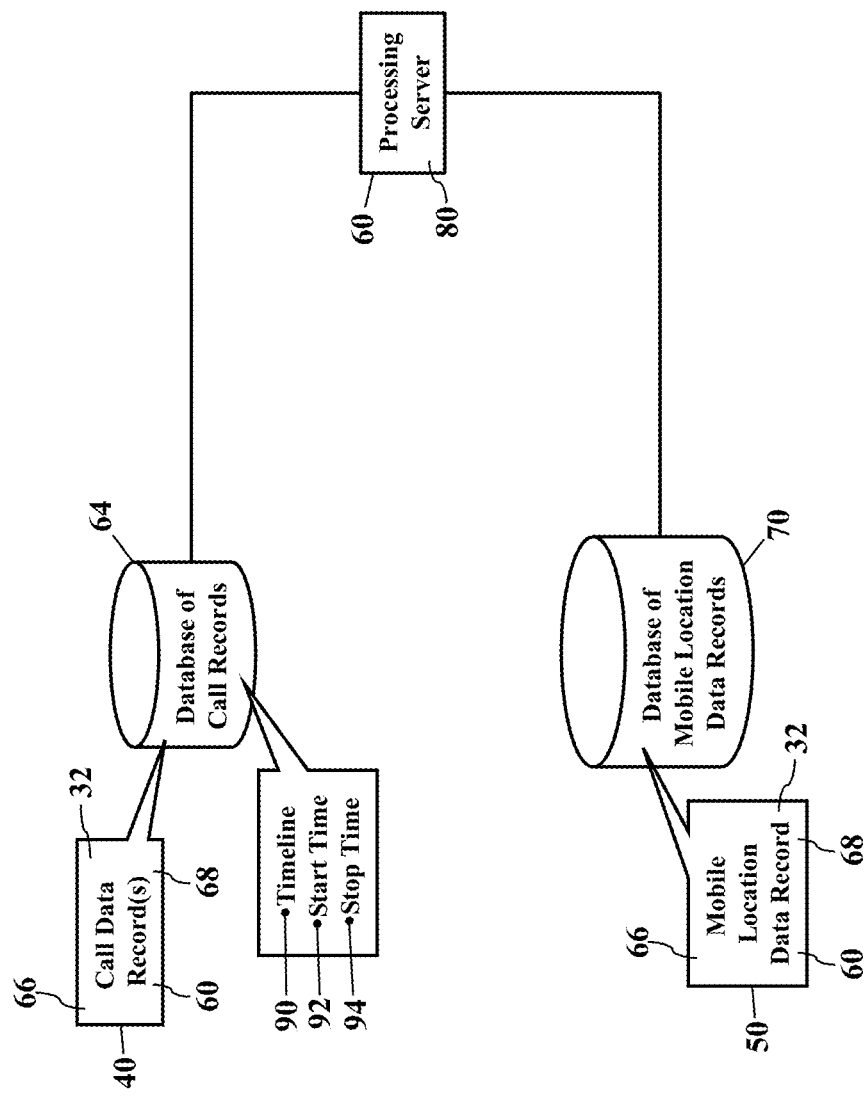

FIGS. 1-3 are schematics illustrating an environment in which exemplary embodiments may be implemented. FIG. 1 illustrates a wireless mobile device 20 interacting with a base station 22. The mobile device 20 is illustrated as a smartphone 24, which many people carry. However, the mobile device 20 may be any other processor-controlled device, as later paragraphs will explain. As the reader likely understands, the smartphone 24 and the base station 22 communicate using a wireless network 26. The wireless network 26 may commonly be a cellular network, which again many people utilize with the smartphone 24. However, exemplary embodiments may be applied to any wireless network using any electromagnetic frequency and wireless standard, as later paragraphs will explain. As the reader will also likely understand, the smartphone 24 and the base station 22 may cooperate when processing a cellular call 28 and/or data 30. That is, whenever a user of the smartphone 24 places or receives the call 28, the smartphone 24 and the base station 22 wirelessly communicate. Likewise, whenever the user of the smartphone 24 searches the Internet for information, the smartphone 24 and the base station 22 wirelessly communicate the electronic data 30. The call 28 and/or the electronic data 30 may typically include a location 32 of the smartphone 24. Again, as the reader likely understands, the smartphone 24 has a global positioning system (or "GPS") receiver 34 that determines the current location 32 as GPS coordinates or information. So, whenever the smartphone 24 and the base station 22 send, receive, or exchange information, the current location 32 may be reported.

For example, detailed call records may be generated. When the base station 22 processes the call 28, the base station 22 may generate an electronic call data record 40. The base station 22, for example, may include a mobile switch 42 that generates the call data record 40. Regardless, the call data record 40 logs information describing a time, a date, a duration, a calling number or calling address (e.g., VoIP), a called number or destination address, and/or a type of network processing the call 28. The call data record 40, in other words, may contain Customer Proprietary Network Information (or "CPNI") related to the use of a telecommunications service provided by the base station 22, for either traditional telephony calls or packetized voice-over Internet Protocol calls. The call data record 40 may also include the current location 32 associated with the smartphone 24. The call data record 40 thus describes the call 28 in terms of technical configuration, type, destination, location, and amount of use of the telecommunications service provided by the base station 22 (or any other portion of a cellular or telephony network, which is not shown for simplicity). The call data record 40 is generally well known and thus need not be further explained.

Detailed locational data may also be generated. As the base station 22 sends and receives the data 30, the base station 22 may also generate an electronic mobile location data record 50. The mobile location data record 50 describes or logs usage of the data 30 by the smartphone 24. The mobile location data record 50, for example, may record what website domains are requested or received, network addresses (e.g., Internet Protocol addresses), times, dates, and any other details of data interactions with the base station 22. Moreover, the mobile location data record 50 may also include the location 32 of the smartphone 24 during data interactions with the base station 22. Again, as the reader likely understands, most smartphones periodically report their GPS location when making requests or responses to the base station 22. So, whenever the smartphone 24 searches the Internet for a website, downloads email, or receives text messages, the smartphone 24 may also wirelessly report its current location 32. The base station 22 may thus log the electronic mobile location data record 50 during any interaction, exchange, or data session. The electronic mobile location data record 50 is generally well known and thus need not be further explained.

FIG. 2 illustrates a processing server 60. After the call data record 40 is generated, the call data record 40 is packetized and routed into a communications network 62 for delivery to a network address associated with the processing server 60. When the call data record 40 is received, the processing server 60 stores the call data record 40 in an electronic database 64 of call records. FIG. 2 illustrates the database 64 of call records being stored within the processing server, but the some or all of the entries in the database 64 of call records may be remotely located and retrieved from some other location accessible using the communications network 62. Regardless, the call data record 40 is stored in an electronic database association with a unique identifier of the smartphone 24. The processing server 60, for example, stores the call data record 40 in association with a cellular identifier 66 associated with the smartphone 24. The cellular identifier 66, for example, may be a cellular telephone number (or "CTN"), an International Mobile Subscriber Identity ("IMSI"), or a Mobile Station International Subscriber Directory Number ("MSISDN"). The call data record 40, however, may be associated with any other alphanumeric combination that uniquely identifies the smartphone 24, such as a serial number, Internet Protocol address, or account. The electronic database association may further include a date and time stamp 68 (such as the date and time associated with the call 28) and the location 32 reported by the smartphone 24.

The processing server 60 may also receive the mobile location data record 50. After the mobile location data record 50 is generated, the mobile location data record 50 is packetized and routed into the communications network 62 for delivery to the network address associated with the processing server 60. The processing server 60 stores the mobile location data record 50 in a database 70 of mobile location records. FIG. 2 illustrates the database 70 of mobile location records also being stored within the processing server, but the some or all of the entries in the database 70 of mobile location records may be remotely located and retrieved from some other location accessible using the communications network 62. Regardless, the mobile location data record 50 may also be stored in an electronic database association with the unique identifier of the smartphone 24, such as the cellular identifier 66. The electronic database association may further include the date and time stamp 68 associated with the data 30 and the location 32 reported by the smartphone 24.

The processing server 60 may thus manage a central repository of valuable information. Over time the database 64 of call records reveals important historical records of the calls 28 received or requested by the smartphone 24. The database 70 of mobile location records also stores historical locational records of the electronic data 30 associated with the smartphone 24. These historical records may thus be analyzed or profiled to improve services and to suggest products as electronic advertising.

The processing server 60 may invoke an anonymizer 80. Before the database 64 of call records is analyzed, the call data record 40 may need to be anonymized. The mobile location data record 50 may also need to be anonymized. This anonymization may be required by governmental regulations. In simple words, governmental regulations allow the call data record 40 and the mobile location data record 50 to be used by a network carrier for any purposes of rendition of service including network and customer care functions. However, other uses of the call data record 40 and/or the mobile location data record 50 must occur after aggregation and/or anonymization of the information. For example, personally identifying information (e.g., name, number, and/or the cellular identifier 66) may need to be removed or redacted before analysis of demographic trends, travel patterns, and purchasing habits.

However, call records and locational records are not easily reconcilable. As FIGS. 1-2 illustrate, the call data record 40 and the mobile location data record 50 are separately generated. Mobile location datasets are derived from mobile radio network signaling units (such as the Node B Application Part, the radio network controller, and/or the Radio Access Network Application Part). These control plane messaging and signaling protocols do not readily lend themselves to being associated with a voice or data session. So, even though the call data record 40 and the mobile location data record 50 may be contemporaneous in date and time (thus logging the call 28 simultaneously having the electronic data 30), the database records may be inadvertently revealed.

FIG. 3 illustrates an elegant solution. Exemplary embodiments eliminate any or all mobile location data records 50 that are associated with voice calls. That is, the processing server 60 may query both the database 64 of call records and the database 70 of mobile location records for similar search terms. The processing server 60, for example, may retrieve both the call data records 40 and the mobile location data records 50 for the same cellular identifier 66. The processing server 60 may then compare the call data records 40 and the mobile location data records 50 for synchronous entries related to voice calls. For example, the call data records 40 reveal one or more electronic timelines 90 describing the calls (illustrated as reference numeral 28 in FIGS. 1-2)

associated with the cellular identifier 66. That is, the processing server 60 retrieves the start times 92 and the stop times 94 of the calls 28 associated with the cellular identifier 66. The processing server 60 may then compare the start times 92 and the stop times 94 of the calls 28 to the mobile location data records 50 for the same cellular identifier 66. Any matching entries thus reveal the mobile location data records 50 occurring within the timelines 90 of the calls 28 associated with the cellular identifier 66. Exemplary embodiments, in other words, identify the mobile location data records 50 that match the dates and times of the calls 28 associated with the smartphone 24.

The processing server 60 may thus exclude the matching entries. Governmental regulations preclude revealing location data for third party uses, such as demographic profiling, travel analysis, and determinations of purchasing habits. The processing server 60 may thus remove the mobile location data records 50 from third party analysis that are contemporaneous with the call data records 40. Exemplary embodiments permit use of the database 70 of mobile location records for network and customer care uses, mandated uses (such as CALEA and E911), and opted-in services. However, the processing server 60 may also selectively remove disallowed database entries. This exclusion capability unlocks the mobile location data records 50 for use in a wide variety of valuable studies while remaining compliant with FCC rules. Exemplary embodiments thus protect CPNI associated with calls, but the processing server 60 may still tap other database content for third party value uses.

Figure 4:
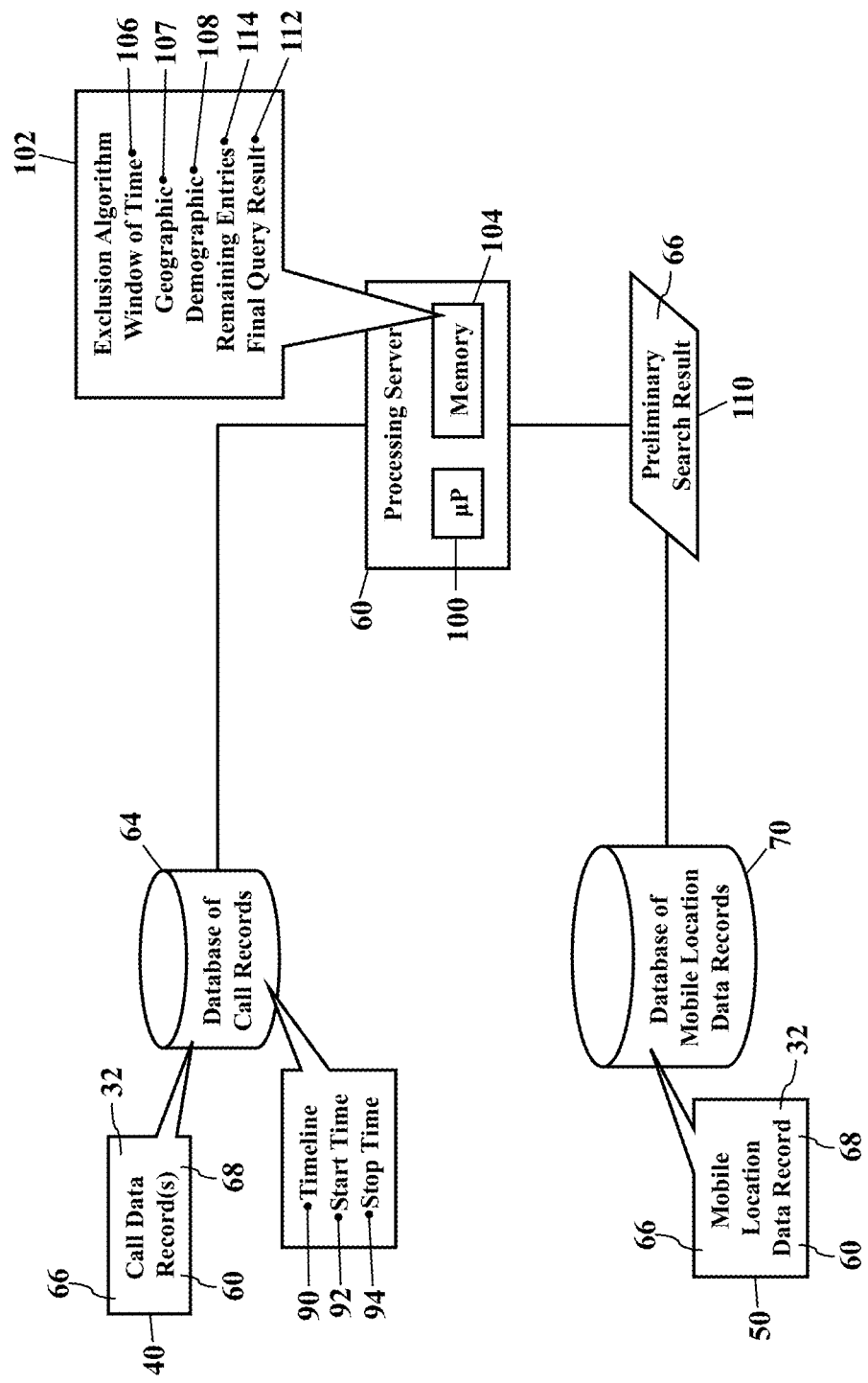
FIG. 4 is a more detailed block diagram illustrating a processing server, according to exemplary embodiments.

FIG. 4 is a more detailed block diagram illustrating the processing server 60, according to exemplary embodiments. The processing server 60 has a processor 100 (e.g., "µLP"), application specific integrated circuit (ASIC), or other component that executes an exclusion algorithm 102 stored in a local memory 104. The exclusion algorithm 102 instructs the processor 100 to perform operations, such as first querying the database 70 of mobile location records to retrieve the mobile location data records 50 that match any query search term. The processor 100, for example, may query for a window 106 of time, a geographic location 107, and/or a demographic parameter 108 (such as age, sex, or income). The processing server 60 may thus generate or receive a preliminary search result 110 of all the mobile location data records 50 that match the query search term(s). The electronic mobile location data records 50 thus reveal the cellular identifiers 66 having database associations with the query search term(s) (e.g., the window 106 of time, the geographic location 107, and/or the demographic parameter 108).

The processing server 60 may then query the database 64 of call records. Once the cellular identifiers 66 are known (derived from the preliminary search result 110), the processing server 60 may retrieve records of voice calls for those same cellular identifiers 66. The processing server 60 may thus query the database 64 of call records for the one or more cellular identifiers 66 in the mobile location data records 50. The processing server 60 thus retrieves the one or more electronic timelines 90 of the calls (illustrated as reference numeral 28 in FIGS. 1-2) associated with the cellular identifiers 66. Each electronic timeline 90 may describe the start time 92 and the stop time 94 of a different call 28 associated with one of the cellular identifiers 66.

The processing server 60 may then remove matching entries. Once the processing server 60 obtains the electronic timelines 90 associated with the cellular identifiers 66, the exclusion algorithm 102 may instruct the processor 100 to compare the electronic timelines 90 to the preliminary search result 110. The processor 100 may thus match the start time 92 and the stop time 94 of a voice call to the mobile location data records 50 associated with one of the cellular identifiers 66. This comparison may thus reveal the mobile location data records 50 that match the timelines 90 of voice calls associated with the cellular identifier 66. The exclusion algorithm 102 may thus instruct the processor 100 to exclude or remove these matching entries from the preliminary search result 110. The processing server 60 may thus generate a final query result 112 as the remaining entries 114 in the preliminary search result 110 that lack a timing association with voice calls. The final query result 112, in other words, lacks the mobile location data records 50 associated with voice calls for any one of the cellular identifiers 66. The final query result 112 may thus be used for third party profile analysis without revealing personal information.

Exemplary embodiments may be applied regardless of networking environment. Exemplary embodiments may be easily adapted to mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. The processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 5:
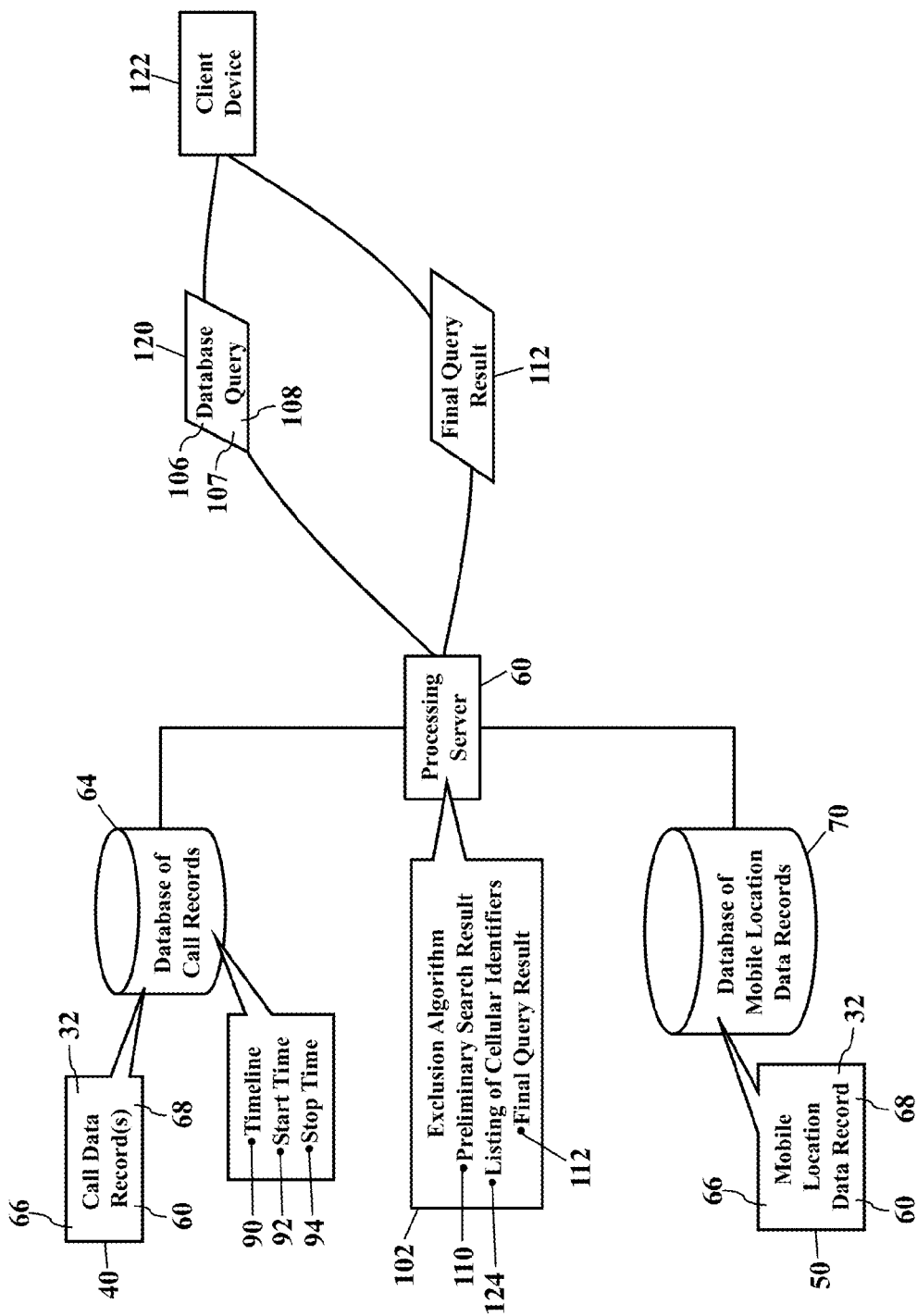
FIG. 5 is a block diagram illustrating a client-server architecture, according to exemplary embodiments.

FIG. 5 is a block diagram illustrating a client-server architecture, according to exemplary embodiments. Here the processing server 60 responds to search requests from client devices. As this disclosure previously explained, the processing server 60 serves as a central repository for coveted information. The content stored in the database 64 of call records and in the database 70 of mobile location records may be mined for demographic profiling, travel analysis, and purchasing habits (such as credit card records for mobile commerce). Some of this database content, though, may be precluded from disclosure. The processing server 60, then, may receive a database query 120 from a client device 122. The client device 122 operates under the direction of some party interested in acquiring the database information guarded by the exclusion algorithm 102. A marketing firm or advertiser, for example, may wish to learn the purchasing and travel patterns for one or more cellular data users.

FIG. 5 thus illustrates the database query 120. The electronic database query 120 is sent from the client device 122 and received by the processing server 60. The electronic database query 120 may typically route along the communications network 62 (illustrated in FIG. 2) and be received by a network interface operating under the direction or instruction of the processor 100 (illustrated in FIG. 4) in the processing server 60. The electronic database query 120 may be received as packets of data according to a packet protocol (such as any of the Internet Protocols). The packets of data contain bits or bytes of data describing the contents, or payload, of a message. A header of each packet of data may contain routing information identifying an origination address and/or a destination address. The exclusion algorithm 102, for example, may instruct the processing server 60 to inspect the packetized database query 120 for query search terms. As the database query 120 may be received from a third party entity, the database query 120 may specify the window 106 of time for which search results are desired, perhaps along with the geographic search parameter 107. The window 106 of time may be a single specific date and time, or the window 106 of time may be a range from a beginning date to an ending date. The geographic search parameter 107 specifies some location of interest for which search results are desired. While the geographic search parameter 107 may describe any address, town, city, state, or even ZIP code, the geographic search parameter 107 may be expressed as a range of GPS coordinates. The database query 120 may also specify the demographic parameter 108. The demographic parameter 108 thus allows a query submitter or requestor to further narrow a search by specifying one or more demographic traits. For example, when any of the mobile location data records 50 is generated, the mobile location data records 50 may be augmented with or associated with demographic information (e.g., income range, sex, and age range).

The processing server 60 may then consult the database 70 of mobile location records. The exclusion algorithm 102 may cause the processing server 60 to first query the database 70 of mobile location records for the window 106 of time, the geographic search parameter 107, and/or the demographic parameter 108. The exclusion algorithm 102 causes the processing server 60 to generate the preliminary search result 110 of all the mobile location data records 50 that match the window 106 of time, the geographic search parameter 107, and/or the demographic parameter 108. The preliminary search result 110, for example, reveals all the cellular identifiers 66 of mobile devices having locational data matching the dates, times, and location specified in the database query 120.

Some records may need removal. After the processing server 60 generates the preliminary search result 110, some of the search results may need to be removed or redacted to protect personal information (e.g., the CPNI mentioned above). That is, some of the mobile location data records 50 in the preliminary search result 110 may need exclusion or deletion to prevent disclosure of personal information. The exclusion algorithm 102 may thus cause the processing server 60 to generate a listing 124 of cellular identifiers contained within the preliminary search result 110. The processing server 60 may thus separately store the preliminary search result 110 in a condensed form that only retains the cellular identifiers 66 of mobile devices having locational data matching the dates, times, and location specified in the database query 120.

The processing server 60 may then consult the database 64 of call records. The exclusion algorithm 102 may instruct the processing server 60 to perform a second query operation. That is, the processing server 60 may query the database 64 of call records for each cellular identifier 66 in the listing 124 of cellular identifiers. The processing server 60 thus retrieves the call data records 40 associated with each cellular identifier 66 in the listing 124 of cellular identifiers. The call data records 40 describe the timelines 90 of the calls 28 associated with each cellular identifier 66 in the listing 124 of cellular identifiers. The processing server 60 thus determines the start times 92 and the stop times 94 of all the calls 28 associated with the listing 124 of cellular identifiers.

The processing server 60 generates the final query result 112. Once the processing server 60 determines the start times 92 and the stop times 94 of all the calls 28 associated with the listing 124 of cellular identifiers, the processing server 60 again retrieves the preliminary search result 110 (perhaps from the memory 104 illustrated in FIG. 4). The exclusion algorithm 102 may then cause the processing server 60 to compare the entries in the preliminary search result 110 with the start times 92 and/or the stop times 94 describing the calls 28 associated with each cellular identifier 66 in the listing 124 of cellular identifiers. The exclusion algorithm 102 instructs the processing server 60 to filter or remove any mobile location data records 50 having the time stamp 68 matching a range between the start times 92 and the stop times 94 of voice calls. The processing server 60 thus generates the final query result 112 as those mobile location data records 50 that remain after removal of entries that correspond to the calls 28.

The processing server 60 sends the final query result 112. The processing server 60 may instruct its network interface to packetize the final query result 112 for transmission into the communications network 62 (illustrated in FIG. 2). The query result 112 may route as the packets of data to a destination address (perhaps associated with the client device 122 submitting the database query 120). The query result 112 includes the mobile location data records 50 that match the window 106 of time, the geographic search parameter 107, and/or the demographic parameter 108 for which search results were desired, minus the mobile location data records 50 that are contemporaneous with voice calls. The final query result 112 thus removes, filters, or excludes the mobile location data records 50 associated with voice calls that require protection of personal information.

Exemplary embodiments thus present an elegant solution. Exemplary embodiments exclude the mobile location data records 50 which coincide with the timeline 90 of any voice call per cellular identifier 66 (e.g., the smartphone 24 and/or customer account). Exemplary embodiments thus allow an enterprise customer to submit the database query 120 specifying its desired search terms (e.g., the window 106 of time, the geographic search parameter 107, and/or the demographic parameter 108). The processing server 60 conducts the search and generates the query result 112. The processing server 60 thus generates the collection of all mobile location data that pertain to the geography, timeline, and demographic in the search query 120, while selectively removing all mobile locates that correspond to the timelines 90 of each customer's voice calls.

Exemplary embodiments maintain raw locational data. All the mobile location data records 50 are separately maintained from the call data records 40, thus preserving the raw locational information for permitted application to network and customer care purposes. Further, if a customer opts-in for using their mobile location data records 50 for profiling purposes, the raw locational information is still preserved. However, exemplary embodiments eliminate the mobile location data records 50 associated with voice calls for application to non-network and non-customer-care uses, thus remaining compliant with governmental regulations.

Figure 6:
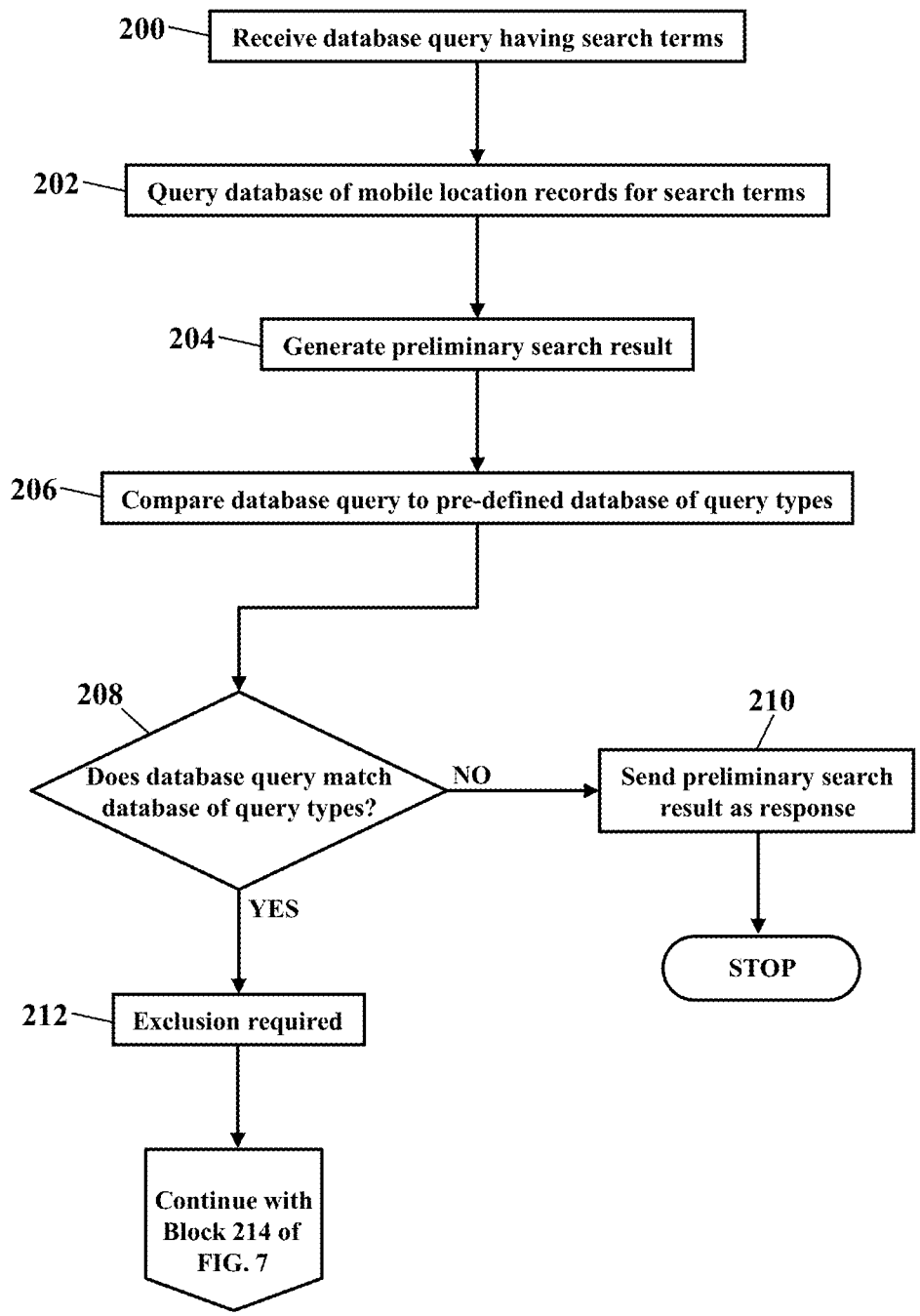
FIGS. 6-7 are flowcharts illustrating compliant locational disclosure, according to exemplary embodiments.
Figure 7:
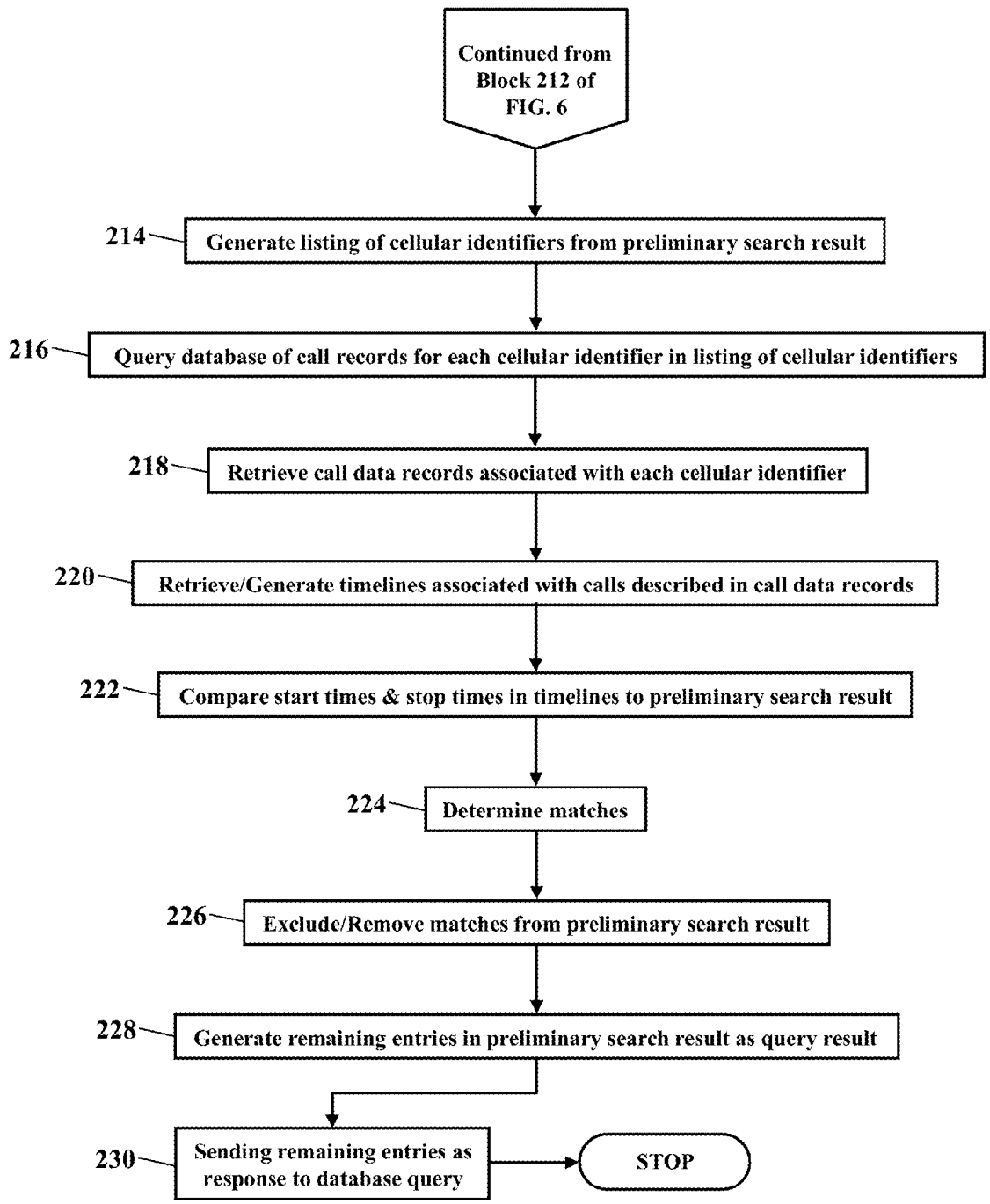

FIGS. 6-7 are flowcharts illustrating compliant locational disclosure, according to exemplary embodiments. The electronic database query 120 is received (Block 200). The database query 120 may specify one or more of the window 106 of time, the geographic search parameter 107, and/or the demographic parameter 108. The database 70 of mobile location records may thus be queried for the search terms specified in the electronic database query 120 (Block 202). The preliminary search result 110 is generated for all the mobile location data records 50 that match the search terms (Block 204).

A protective decision is then determined. Certain types of database queries may likely require protection of personal information. Exemplary embodiments, then, may pre-define or pre-configure a database of query types that stores electronic information describing queries for which CPNI exclusion is required. The electronic database query 120 is compared to the entries in the database of query types (Block 206). If any information and/or query term in the electronic database query 120 fails to match an entry in the database of query types (Block 208), then the preliminary search result 110 is sent as a response to the database query 120 (Block 210). However, if any information and/or query term in the electronic database query 120 matches an entry in the database of query types (Block 208), then exclusion of personal information may be required (Block 212).

Additional processing may thus be required. The preliminary search result 110, in simple words, reveals a population or grouping of the cellular identifiers 66 having the mobile location data records 50 that match the query requestor's desired date/time, geographic location, and/or demographic profile (specified in the database query 120). But some of these mobile location data records 50 may need removal, based on the database of query types. Some entries in the preliminary search result 110 may need exclusion to protect personal information (e.g., the CPNI mentioned above). That is, some of the mobile location data records 50 in the preliminary search result 110 may need deletion to prevent disclosure.

The flowchart may continue with FIG. 7. The listing 124 of cellular identifiers is generated from the preliminary search result 110 (Block 214). The database 64 of call records is queried for each cellular identifier 66 in the listing 124 of cellular identifiers (Block 216). The call data records 40 associated with each cellular identifier 66 in the listing 124 of cellular identifiers are retrieved (Block 218). The timelines 90 of the calls 28 associated with each cellular identifier 66 in the listing 124 of cellular identifiers is retrieved/generated from the call data records 40 (Block 220). The start times 92 and the stop times 94 of the calls 28 in the timelines 90 are compared to the entries in the preliminary search result 110 (Block 222). Matching entries are determined (Block 224) and excluded or removed from the preliminary search result 110 (Block 226). The remaining entries are generated as the final query result 112 (Block 228) and sent as the response to the database query 120 (Block 230).

Figure 8:
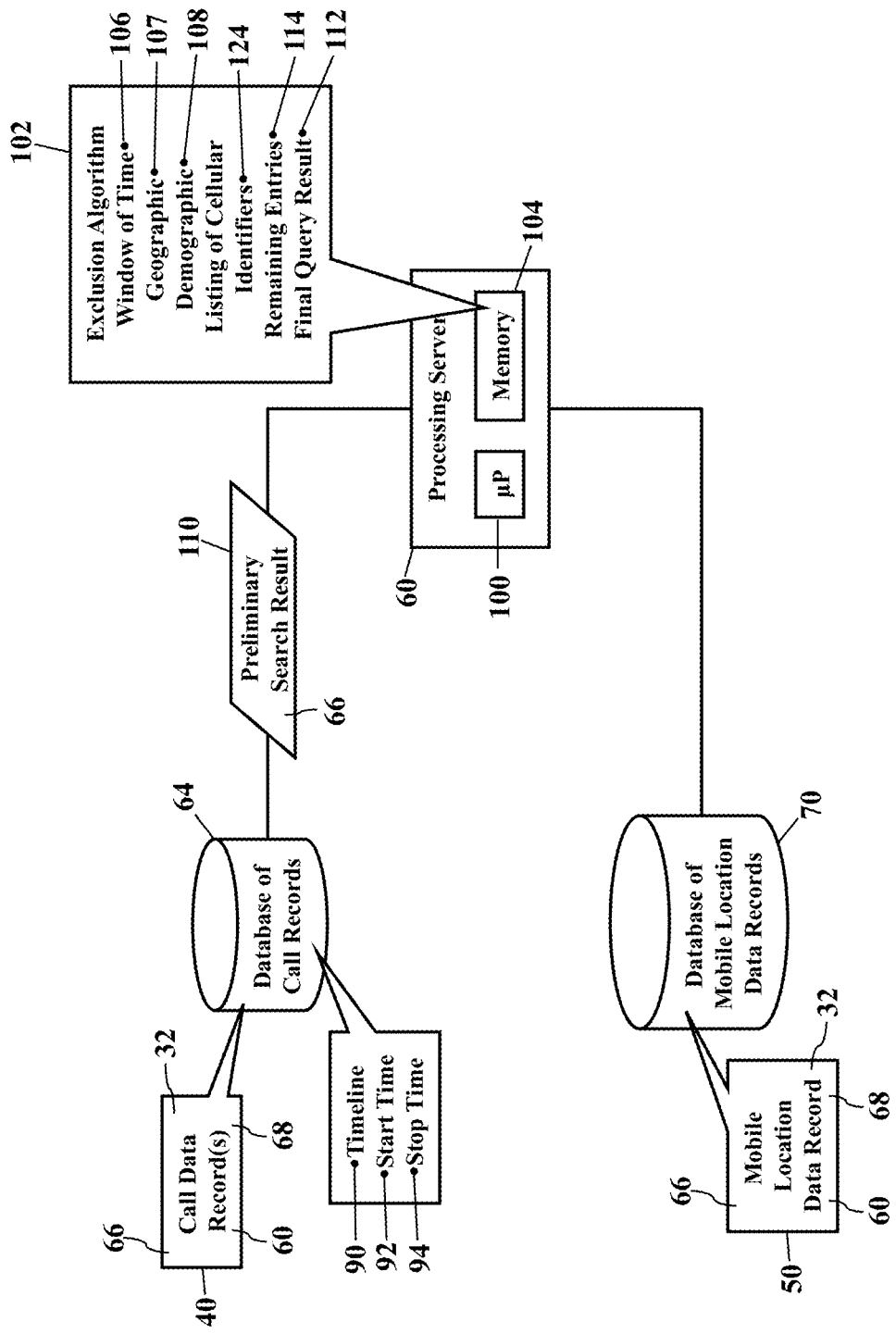
FIG. 8 is a schematic further illustrating protection of personal information, according to exemplary embodiments.

FIG. 8 is a schematic further illustrating protection of personal information, according to exemplary embodiments. Here the processing server 60 may first query the database 64 of call records. When the processing server 60 receives the database query (illustrated as reference numeral 120 in FIG. 5), the processing server 60 may first query for the records of voice calls matching the query search terms (e.g., the window 106 of time, the geographic search parameter 107, and/or the demographic parameter 108). The processing server 60 may thus generate or receive the preliminary search result 110 as those call data records 40 describing voice calls associated with the query search terms. The processing server 60 may then generate the listing 124 of cellular identifiers from the preliminary search result 110 and query for the corresponding mobile location data records 50.

The processing server 60 may then remove matching entries. The processing server 60 may compare the mobile location data records 50 to the preliminary search result 110. That is, the processor 100 may compare the mobile location data records 50 to the electronic timelines 90 from the preliminary search result 110. For each cellular identifier 66 in the listing 124 of cellular identifiers, the processor 100 may thus match the start time 92 and the stop time 94 of a voice call to the mobile location data records 50 associated with the same cellular identifier 66. This comparison may again reveal the mobile location data records 50 that match the timelines 90 of voice calls associated with the cellular identifier 66. The exclusion algorithm 102 may thus instruct the processor 100 to exclude or remove these matching entries from the mobile location data records 50. The processing server 60 may thus generate the final query result 112 as the remaining entries 114 in the mobile location data records 50 that lack a timing association with voice calls. The final query result 112, in other words, lacks the mobile location data records 50 associated with voice calls for any one of the cellular identifiers 66. The final query result 112 may thus be used for third party profile analysis without revealing personal information.

Exemplary embodiments may thus emphasize analysis of the mobile location data records 50. That is, the call data records 40 may be used to identify which records to retain while discarding others. Even if the call data records 40 are not complete, there is finite risk of retaining the mobile location data records 50 that were indeed associated with a voice call. Though it may seem initially that the use of the call data records 40 may be an unnecessary step, the fact that multiple radio access bearers are used could make this relevant. For example, the data portion of a multi-RAB session may imply that it is only associated with data when it may have a voice component. Therefore, initial removal of records associated with voice followed by exclusion of records not associated with data sessions might be considered a more comprehensive approach. Exemplary embodiments may thus make a double check of both the call data records 40 and the mobile location data records 50 to ensure exclusion of personal information.

Figure 9:
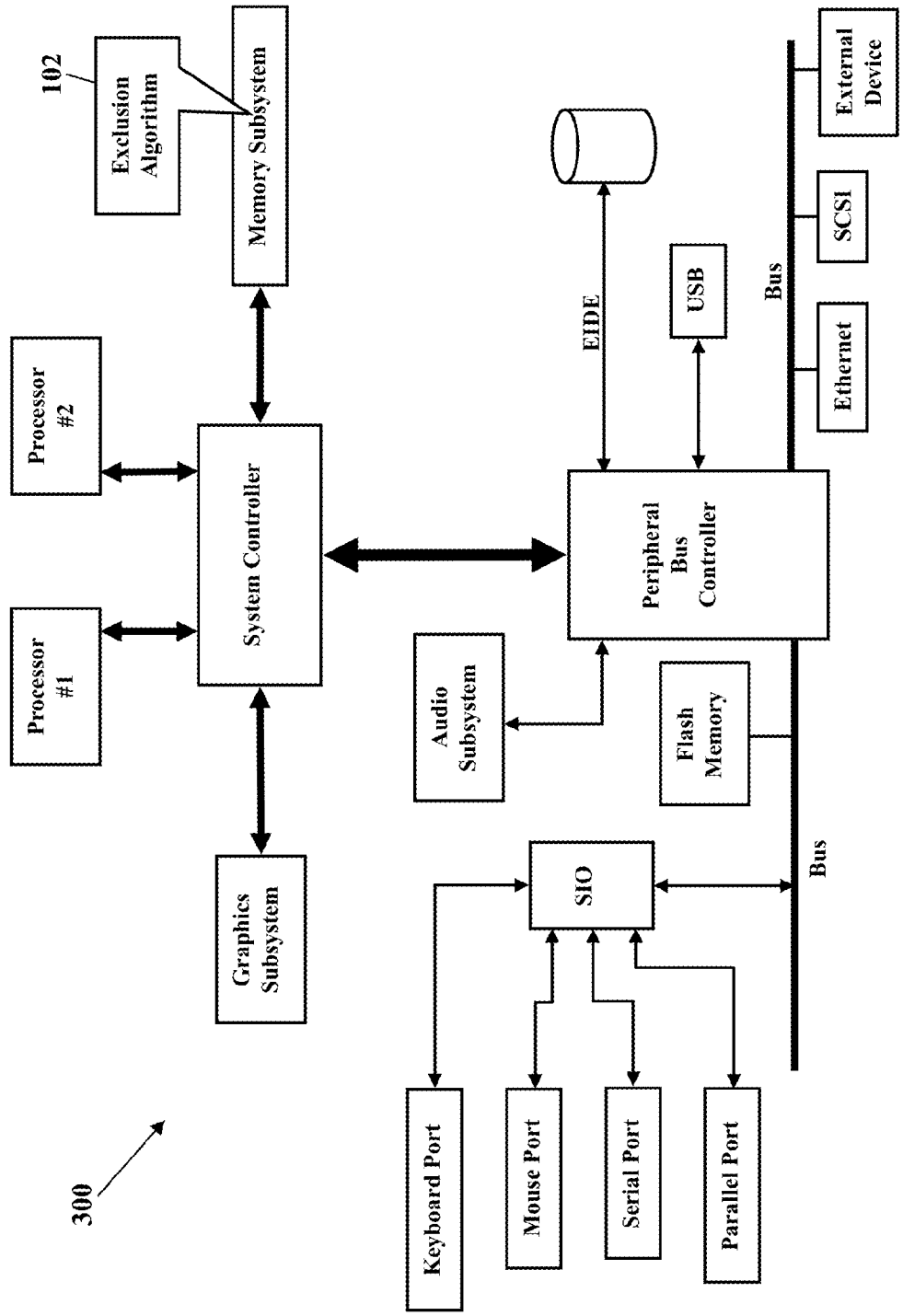
FIGS. 9-10 depict still more operating environments for additional aspects of the exemplary embodiments.

FIG. 9 is a schematic illustrating still more exemplary embodiments. FIG. 9 is a more detailed diagram illustrating a processor-controlled device 300. As earlier paragraphs explained, the exclusion algorithm 102 may operate in any mobile or stationary processor-controlled device. FIG. 9, then, illustrates the exclusion algorithm 102 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 10:
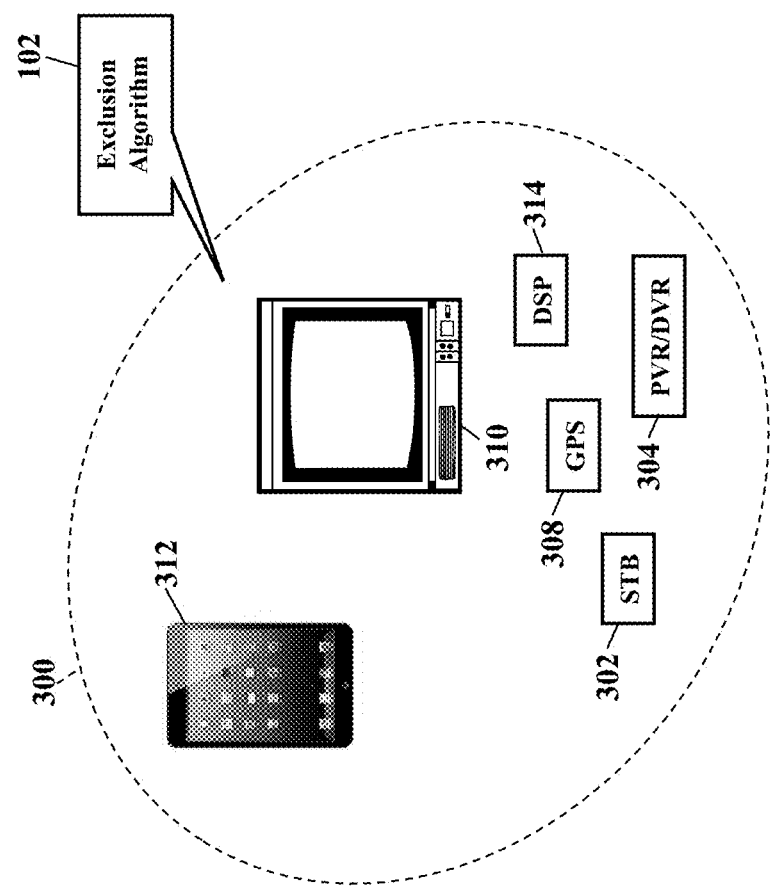

FIG. 10 depicts other possible operating environments for additional aspects of the exemplary embodiments. FIG. 10 illustrates the exclusion algorithm 102 operating within various other processor-controlled devices 300. FIG. 10, for example, illustrates that the exclusion algorithm 102 may entirely or partially operate within a set-top box ("STB") (302), a personal/digital video recorder (PVR/DVR) 304, a Global Positioning System (GPS) device 308, an interactive television 310, a tablet computer 312, or any computer system, communications device, or processor-controlled device utilizing the processor 60 and/or a digital signal processor (DP/DSP) 314. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for protecting personal information, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
a processor; and
a memory device, the memory device storing instructions, the instructions when executed causing the processor to perform operations, the operations comprising:
receiving an electronic database query sent from a third party requesting mobile Internet data records describing cellular data sessions associated with a mobile device;
generating a preliminary search result in response to the electronic database query sent from the third party, the preliminary search result comprising the mobile Internet data records describing the cellular data sessions associated with a cellular identifier associated with the mobile device;
retrieving electronic call data records associated with the cellular identifier, the electronic call data records describing cellular calls associated with the cellular identifier;
electronically comparing the electronic call data records with the mobile Internet data records;
determining a synchronous match between a call data record in the electronic call data records and a mobile Internet data record in the mobile Internet data records;
excluding the mobile Internet data record from the preliminary search result in response to the synchronous match; and
sending remaining search results in the preliminary search result to the third party as a query response to the electronic database query, the remaining search results excluding the mobile Internet data record to protect information related to the call data record.

2. The system of claim 1, wherein the operations further comprise determining a time associated with the electronic call data record matches the time associated with the mobile Internet data record.

3. The system of claim 1, wherein the operations further comprise matching a timeline associated with the call data record to the mobile Internet data record.

4. The system of claim 1, wherein the operations further comprise determining a type of the electronic database query.

5. The system of claim 4, wherein the operations further comprise retrieving the electronic call data records in response to the type of the electronic database query.

6. The system of claim 1, wherein the operations further comprise sending remaining ones of the mobile Internet data records after the excluding of the mobile Internet data record as the query response to the electronic database query.

7. The system of claim 1, wherein the operations further comprise determining the mobile Internet data records that lack the synchronous match with the electronic call data records.

8. A method, comprising:
receiving, by a server, packets of data containing an electronic database query sent from a third party, the electronic database query requesting mobile Internet data records describing cellular data sessions conducted between a mobile device and cellular base stations;
retrieving, by the server, the mobile Internet data records describing the cellular data sessions conducted between the mobile device and the cellular base stations;
retrieving, by the server, electronic call data records describing calls associated with the mobile device;
electronically comparing, by the server, the electronic call data records with the mobile Internet data records;
determining, by the server, a synchronous match between a call data record in the electronic call data records and a mobile Internet data record in the mobile Internet data records;
excluding, by the server, the mobile Internet data record from the mobile Internet data records in response to the synchronous match; and
sending, by the server, remaining ones of the mobile Internet data records to the third party as a query response to the electronic database query;
wherein the mobile Internet data record having the synchronous match is excluded from the third party to protect information related to the call data record.

9. The method of claim 8, further comprising determining a time associated with the electronic call data record matches the time associated with the mobile Internet data record.

10. The method of claim 8, further comprising matching a timeline of a call to the mobile location data record.

11. The method of claim 8, further comprising determining a type of the electronic database query.

12. The method of claim 11, further comprising retrieving the electronic call data records in response to the type of the electronic database query.

13. The method of claim 8, further comprising matching a time associated with the electronic call data records to the time associated with the mobile Internet data records.

14. A memory device storing instructions that when executed cause a processor to perform operations, the operations comprising:
receiving packets of data containing an electronic database query sent from a third party requesting mobile Internet data records describing cellular data sessions conducted between cellular base stations and a mobile device;

retrieving the mobile Internet data records describing the cellular data sessions conducted between the cellular base stations and the mobile device;

retrieving electronic call data records associated with the mobile device, the electronic call data records describing cellular calls associated with the mobile device;

electronically comparing the electronic call data records with the mobile Internet data records;

determining a synchronous match between a call data record in the electronic call data records and a mobile Internet data record in the mobile Internet data records;

excluding the mobile Internet data record from the mobile Internet data records in response to the synchronous match; and sending remaining ones of the mobile Internet data records to the third party as a query response to the electronic database query;

wherein the mobile Internet data record having the synchronous match is excluded from the third party to protect information related to call associated with the call data record.

15. The memory device of claim 14, wherein the operations further comprise determining a time associated with the electronic call data record matches the time associated with the mobile Internet data record.

16. The memory device of claim 14, wherein the operations further comprise matching a timeline of the call to the mobile Internet data record.

17. The memory device of claim 14, wherein the operations further comprise determining a type of the electronic database query.

18. The memory device of claim 17, wherein the operations further comprise retrieving the electronic call data records in response to the type of the electronic database query.

19. The memory device of claim 14, wherein the operations further comprise receiving a search term specified by the third party.

* * * * *